United States Patent [19]

Abileah et al.

[11] Patent Number: 4,532,425

[45] Date of Patent: Jul. 30, 1985

[54] GAMMA CAMERA WITH LIGHT GUIDE HAVING GREATER INDEX OF REFRACTION

[75] Inventors: Adi Abileah, Kiriat Bialik; Giora Gafni; Miguel O. Simerman, both of Haifa, all of Israel

[73] Assignee: Elscint Inc., Boston, Mass.

[21] Appl. No.: 405,244

[22] Filed: Aug. 4, 1982

[51] Int. Cl.³ .............................................. G01T 1/202
[52] U.S. Cl. .................................. 250/363 S; 250/368
[58] Field of Search ................ 250/363 S, 487.1, 368, 250/367, 366

[56] References Cited

U.S. PATENT DOCUMENTS 3,859,531 1/1975 Van Dijk .............................. 250/366
4,311,907 1/1982 Takami et al. ...................... 250/368

FOREIGN PATENT DOCUMENTS 2641882 4/1977 Fed. Rep. of Germany ... 250/363 S

Primary Examiner—Janice A. Howell
Assistant Examiner—Constantine Hannaher
Attorney, Agent, or Firm—Sandler & Greenblum

[57] ABSTRACT

A gamma camera comprises a scintillation crystal having an index of refraction of 1.80–190, a collimator for imaging the object on one face of the scintillation crystal, an array of photodetectors arranged around the opposite face of the scintillation crystal, and a light guide interposed between the opposite face of the scintillation crystal and the plurality of photodetectors. The light guide is selected to have an index of refraction of at least 1.60, higher than in the conventional gamma camera, whereupon it has been found that the detection efficiency and the positional accuracy of each scintillation event can be increased, to thereby increase the sensitivity and the spatial resolution of the gamma camera.

10 Claims, 5 Drawing Figures

GAMMA CAMERA WITH LIGHT GUIDE HAVING GREATER INDEX OF REFRACTION

BACKGROUND OF THE INVENTION

The present invention relates to gamma cameras, and particularly to the detector head construction of such cameras.

The gamma camera is increasingly being used as a medical diagnostic instrument for the location and display of abnormalities in human glands and organs. It provides an image representing the distribution of a gamma-ray-emitting tracer material administered to the patient, which material is selected so as to be more greatly absorbed than the other tissues by the abnormality to be detected. The detector head of the gamma camera includes a scintillation crystal which receives the gamma rays emitted by the patient and converts them to light photons, a collimator for transferring the gamma-ray image from the patient to one face of the scintillation crystal, and a plurality of photomutiplier tubes arrayed at the opposite face of the crystal for receiving the light photons emitted at the scintillation points of the crystal as a result of the absorption thereby of the gamma rays. The photomultiplier tubes output pulses which contain information on both the energy absorbed from the gamma rays impinging on the crystal, and also the position of the scintillation points or events within the crystal. These pulses are fed to an arithmetic circuit which produces signals for display on a cathode ray tube, or for further processing by an image processor.

Efforts are continously being made to increase the camera sensitivity, which depends upon its detection efficiency, and also to increase the camera spatial resolution, which refers to its ability to distinguish in the display system between each of two close, isolated, scintillating points. Increasing the thickness of the scintillation crystal increases its detection efficiency, but reduces the spatial resolution of positional accuracy of each scintillation point because of the larger area from which the photons are accepted by each photomultiplier tube. The typical gamma camera now in use includes a scintillation crystal of thallium activated sodium iodide, NaI(TI), of approximately 13 mm thickness, which crystal has an index of refraction ($\mu_{SC}$) of 1.84. The conventional gamma camera also includes a light guide acting as an optical coupling between the exit field of the scintillation crystal and the photomultiplier tubes, the light guide having a index of refraction ($\mu_{LG}$) of about 1.150 in the conventional gamma camera.

BRIEF SUMMARY OF THE INVENTION

We have found that, by increasing the index of refraction ($\mu_{LG}$) of the guide to at least 1.6, and preferably higher, both the detection efficiency and the positional accuracy of each scintillation event can be increased, thereby increasing the sensitivity and the spatial resolution of the gamma camera.

According to a broad aspect of the present invention, therefore, there is provided a gamma camera of the foregoing type and including a scintillation crystal having an index of refraction of 1.80–1.90, wherein a transparent light guide having an index of refraction of at least 1.60 is interposed between the exit face of the crystal and the photomultiplier tubes.

As one example, the transparent light guide may have an index of refraction of about 1.70, thereby producing some divergence, but less than in the conventional gamma camera being used today, in the light exiting from the scintillation crystal to the photomultiplier tubes. According to a second embodiment of the invention, the transparent light guide may have an index of refraction even higher than that of the scintillation crystal, thereby producing convergence rather than divergence, of the light exiting from the scintillation crystal to the photomultiplier tubes.

It has been found that this increase in the index of refraction of the light guide over that in the conventional gamma camera used today decreases the scattering or spreading of the light from the scintillation point or event to the distant photomultiplier tubes, and moreover, decreases the amount of light trapped in the interface between the scintillation crystal and the photomultiplier tubes due to total internal reflection within the crystal, with the result that both the detection efficiency and the positional accuracy of each scintillation event are increased.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
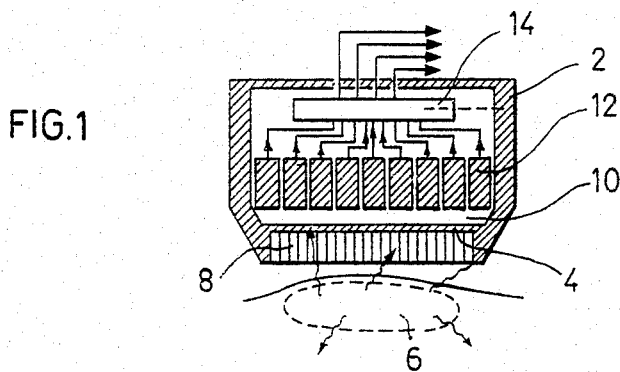
FIG. 1 schematically illustrates a gamma camera detector head constructed in accordance with the present invention.

With reference to FIG. 1 there is illustrated the detector head of the known Anger gamma camera which is in extensive use at the present time. Briefly, the detector head includes a housing 2 of shielding material, such as lead or steel, for shielding the interior of the head, and particularly the scintillation crystal 4 therein, from background radiation and from radiation within the patient's body, generally designated 6, outside the field of view of the detector head. The detector head further includes a collimator 8 which transfers a gamma ray image of a radioactivity distribution from the patient 6 onto the scintillation crystal 4. The light photons emitted at the scintillation points of the crystal following its absorption of the individual gamma rays pass through a transparent light guide 10 and are shared among a closely-packed array of photomultiplier tubes 12. The total electric charge in the electrical pulses from the output of the photomultiplier tubes is proportional to the mean number of photons received by the photocathode of each photomultiplier tube. These pulses contain information on both the energy absorbed within the crystal from the gamma rays and the position of the scintillation point or event, and are fed to a pulse arithmetic circuit 14 which produces signal for transmission to a cathode ray tube display and/or to an image processor.

More particularly, the spatial resolution in the output display of the camera is dependent upon the statistical distribution during photoelectron generation, acceleration and multiplication in any photomultiplier tube caused by a scintillation event. The statistical distribution contributes some spread to the size of the resulting output voltage pulse from each photomultiplier tube. This pulse size is directly proportional to the amount of energy received by the crystal and depends on the distance between a scintillation event and any photomultiplier tube.

As one example, there could be 19 photomultiplier tubes 12, arranged in a 3-4-5-4-3 hexagonal pattern. The five-tube line is partially illustrated in FIG. 2, wherein the tubes are indicated as $P_8$–$P_{12}$. Other arrangements are known using different numbers and arrays of tubes. The scintillation crystal 4 is of the conventional NaI(T1) type, having a thickness of 13 mm and a index of refraction ($\mu_{SC}$) of 1.84.

As indicated earlier, in the conventional gamma camera, the transparent light guide 10, coupling exit face of the scintillation crystal 4 with windows of the photomultiplier tubes 12, is of a material having an index of refraction ($\mu_{LG}$) of about 1.5. An example of such a light guide material is "Lucite" or "Plexiglas", wherein $\mu_{LG}$=1.49 at about 4040 Å, the blue light of the scintillator.

Figure 2:
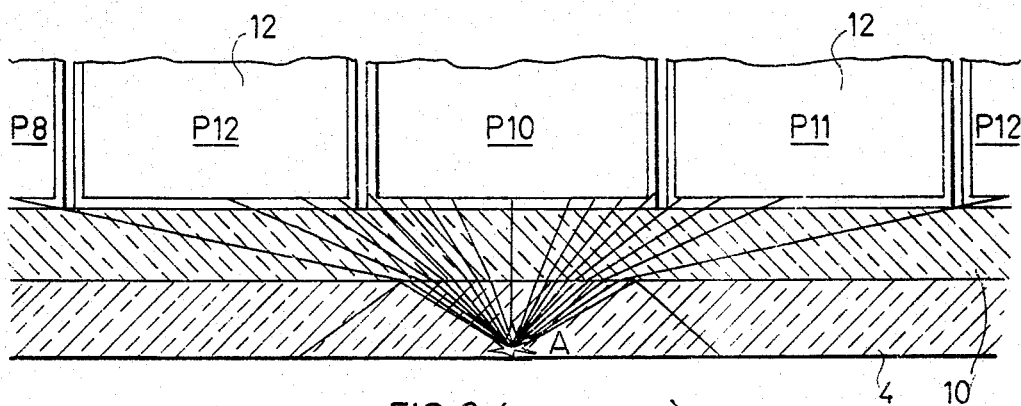
FIG. 2 is an enlarged fragmentary view of the detector head of FIG. 1 illustrating the light-ray pathways from the scintillation crystal to the photomultiplier tubes.

FIG. 2 illustrates what occurs in the conventional gamma camera contructed as described above, and particularly in a camera in which the index of refraction of the scintillation crystal is equal to 1.84 (i.e., $\mu_{SC}$=1.84), and that of the light guide is equal to 1.5 (i.e., $\mu_{LG}$=1.5). The diagram of FIG. 3 will be helpful in understanding the drawbacks of the conventional gamma camera as illustrated in FIG. 2.

Figure 3:
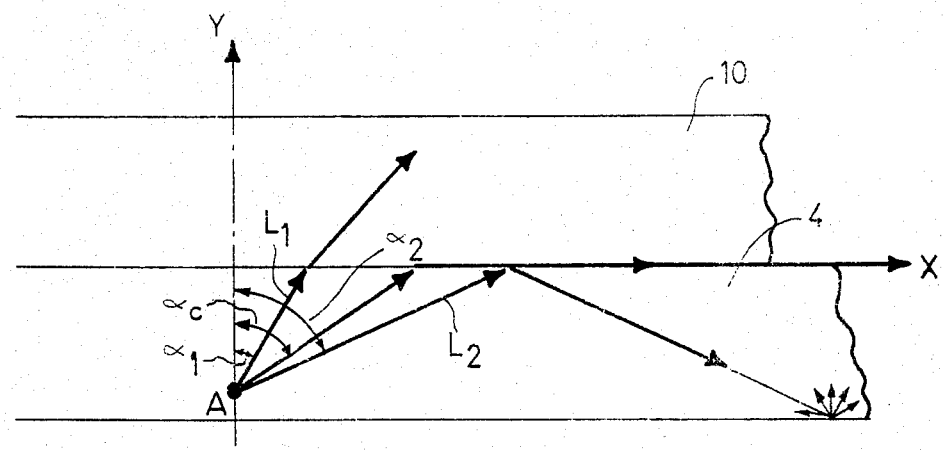
FIG. 3 is a diagrammatic view helpful in understanding the present invention.

Thus, the impingement of the gamma rays on the scintillation crystal 4 produces scintillation events throughout the volume of the crystal. Suppose that a scintillation event occurs in crystal 4 at point A, which, as shown in FIG. 2, is directly aligned with the middle photomultiplier tube $P_{10}$. As shown in FIG. 3, this scintillation event causes light photons to emerge from point A in all directions so as to impinge the light guide 10 at various angles of incidence ($\alpha$). It is known that the critical angle of refraction ($\alpha_c$) depends on the relation of the index of refraction of the scintillation crystal 4 ($\mu_{SC}$) with respect to that of the light guide 10 ($\mu_{LG}$), or more particularly:

$$\alpha_c = \text{arc sin } (\mu_{LG}/\mu_{SC})$$

As shown in FIG. 3, $\alpha_c$ is the angle at which total reflection occurs. Thus, the light photons leaving event position A at smaller angles of incidence with respect to the light guide 10, as illustrated by light ray $L_1$ leaving event position A at angle $\alpha_1$, will pass through the light guide 10 but will be refracted by it away from the normal (axis Y); whereas light photons leaving event position A at angles greater than $\alpha_c$, as indicated by light ray $L_2$ leaving position A at angle $\alpha_2$, will not enter the light guide 10 but rather will be reflected back into the crystal 4.

Thus, the overall result in the conventional gamma camera is illustrated in FIG. 2, wherein it will be seen that: (a) a significant part of the light is totally reflected within the scintillation crystal 4 and therefore does not pass through the light guide 10; and (b) the light which does pass through the light guide 10 diverges away from the normal (axis Y) and is scattered to distant photomultiplier tubes.

Figure 4:
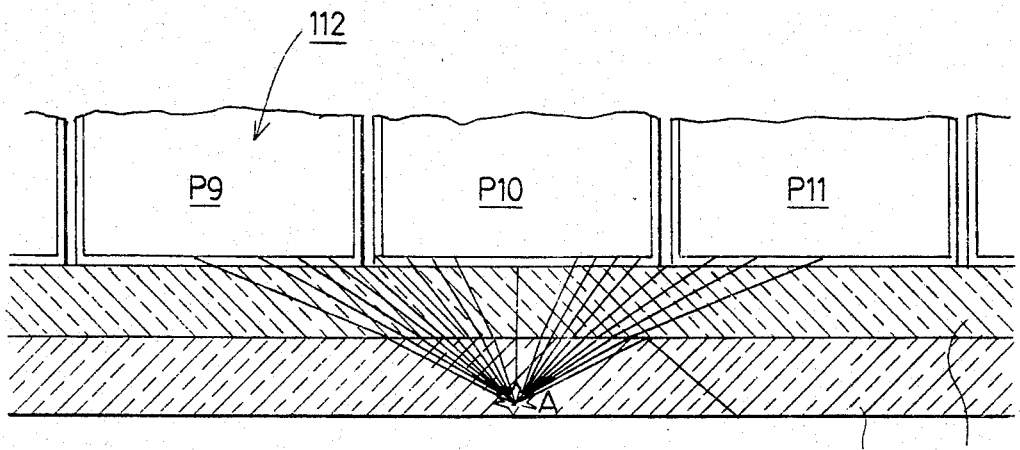
FIG. 4 is a view similar to that of FIG. 2 of a detector head constructed in accordance with the present invention illustrating the light-ray pathway from the scintillation crystal to the photomultiplier tubes.

In accordance with the present invention, the light guide 10 is made of a material having an index of refraction greater than 1.6. FIG. 4 illustrates one example wherein the index of refraction of the light guide therein designated 110, is about 1.7. Thus, the critical angle of refraction with respect to light rays leaving the scintillation crystal 104 and entering the light guide 110 is increased, with the following results:

(a) first, the light entering the light guide 110 is refracted away from the normal (axis Y) to a lesser extent than in the conventional gamma camera as illustrated in FIG. 2, with the result that there will be less spreading or divergence of the light in the light guide 110, with the result that more light will be received by the adjacent one ($P_{10}$) of the photomultiplier tubes 112; and in addition (b) less light will undergo total internal reflection within the scintillation crystal 104, with the result that more light will be received by all the photomultiplier tubes 112.

The net effect of the above-described arrangement illstrated in FIG. 4 is that the detection efficiency of the gamma camera is increased, thereby increasing its sensitivity, and in addition the positional accuracy of each scintillation point is increased, thereby increasing the spatial resolution of the camera. An example of a material sutiable for light guide 110 is Schott Optical Glass, Catalog No. Lak N14 697554, wherein $\mu_{LG}$=1.71804 at about 4040 Å.

Figure 5:
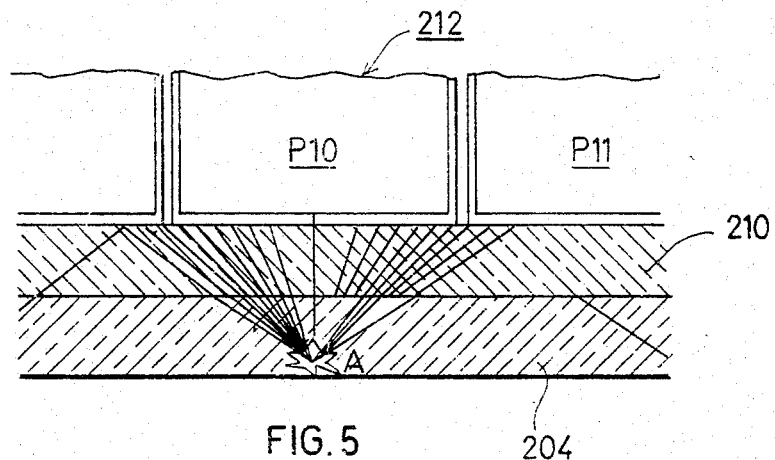
FIG. 5 is a view similar to that of FIG. 4 of another detector head in accordance with the present invention.

FIG. 5 illustrates a further example wherein the index of refraction of the light guide, therein designated 210, is increased so as to be greater than that of the scintillation crystal 204. In such a case, not only will there be less reflection of the light within the scintillation crystal, but also the light entering the light guide will be refracted towards the normal (axis Y), resulting in convergence rather than divergence. As one example, the light guide may have an index of refraction of 1.95 or over, a suitable material being Schott Optical Glass SF59, wherein $\mu_{LG}$=2.04279 at about 4040 Å.

In all the foregoing arrangements, the light guide may be bonded to the scintillation crystal by a glue having an index of refraction about the same as the light guide. Alternatively, an optical grease or other transparent substance may be applied between the crystal and the light guide. As a further alternative, the inlet face of the light guide may be roughened, and optical grease may be applied having an index of refraction equal to, or even less than, that of the light guide.

According to a still further variation, the inlet windows of the photomultiplier tubes may be made of a material having an index of refraction higher than used in the conventional gamma camera. In the conventional gamma camera, the index of refraction of the inlet window is generally about 1.47 which used with the conventional light guide having an index of refraction of about 1.5, produces a divergence of light rays entering the photomultiplier tubes from the light guide. In accordance with this variation of the invention, when using a light guide having an index of refraction of about 1.7, the inlet windows of the photomultiplier tubes could have an index of refraction of 1.5–1.6, thereby producing a convergence of the light rays in the photomultiplier tubes. One example of a suitable material for this use is boro-silicate glass having an index of refraction of 1.53.

While in the above description the light guide is illustrated as a single element or layer of material, it will be appreciated that, in actual practice, it could be constituted of a plurality of layers of transparent material.

Many other variations, modifications and applications of the invention may be made.

What is claimed is:

1. A gamma camera including a scintillation crystal, a collimator for transferring a gamma-ray image to one face of the crystal, a plurality of photomultiplier tubes arrayed at the opposite face of said crystal for receiving the light photons emitted by the crystal as a result of the absorption thereby of gamma rays, and a transparent light guide interposed between said opposite face of the crystal and said photomultiplier tubes, said crystal having an index of refraction of 1.80–1.90, and said light guide having an index of refraction of at least 1.60.

2. The gamma camera of claim 1. wherein the index of refraction of the scintillation crystal is 1.84, and the index of refraction of the light guide is from 1.6 to 1.7.

3. The gamma camera according to claim 1, wherein the index of refraction of the light guide is greater than that of the scintillation crystal.

4. The gamma camera according to claim 3, wherein the index of refraction of the scintillation crystal is 1.84, and the index of refraction of the light guide is 1.95.

5. The gamma camera according to claim 1, wherein said light guide is bonded to said scintillation crystal by glue having an index of refraction approximately equal to that of said light guide.

6. The gamma camera according to claim 1, wherein the surface of said light guide adjacent to said photoconductor is roughened.

7. A gamma camera according to claim 1 wherein the index of refraction of said light guide is uniform in the direction defined by said collimator.

8. A gamma camera according to claim 7 wherein the index of refraction of said light guide is uniform throughout.

9. A gamma camera according to each of claim 2 wherein the index of refraction of said light guide is uniform in the direction by said collimator.

10. A gamma camera according to claim 3 wherein the index of refraction of said light guide is uniform.

* * * * *